July 7, 1970  R. E. DOGGETT  3,519,803
VEHICLE COUNTER
Filed Sept. 30, 1968                                   2 Sheets-Sheet 1
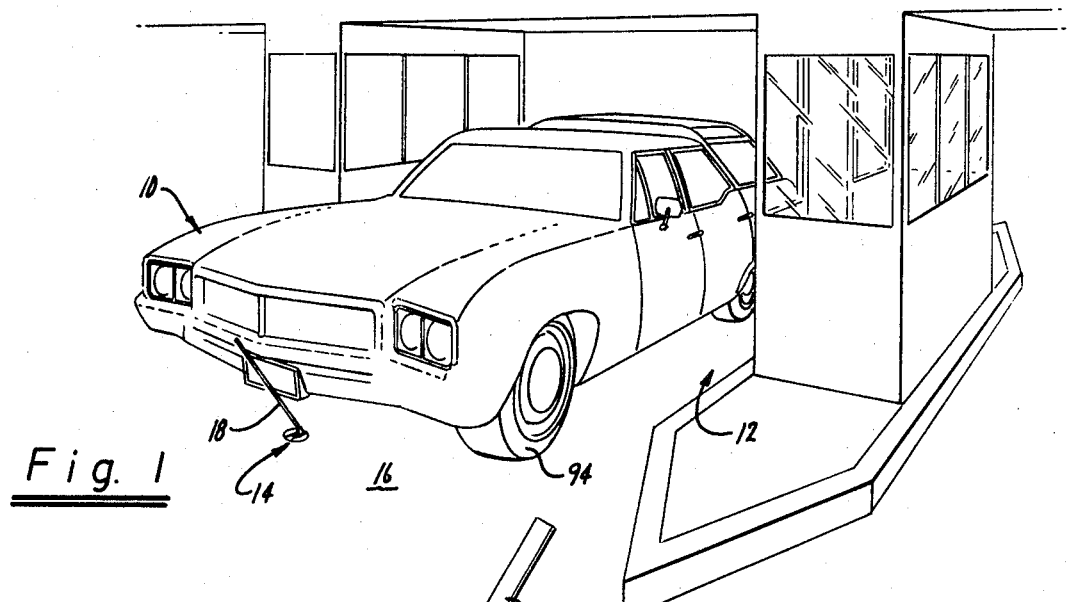
Fig. 1
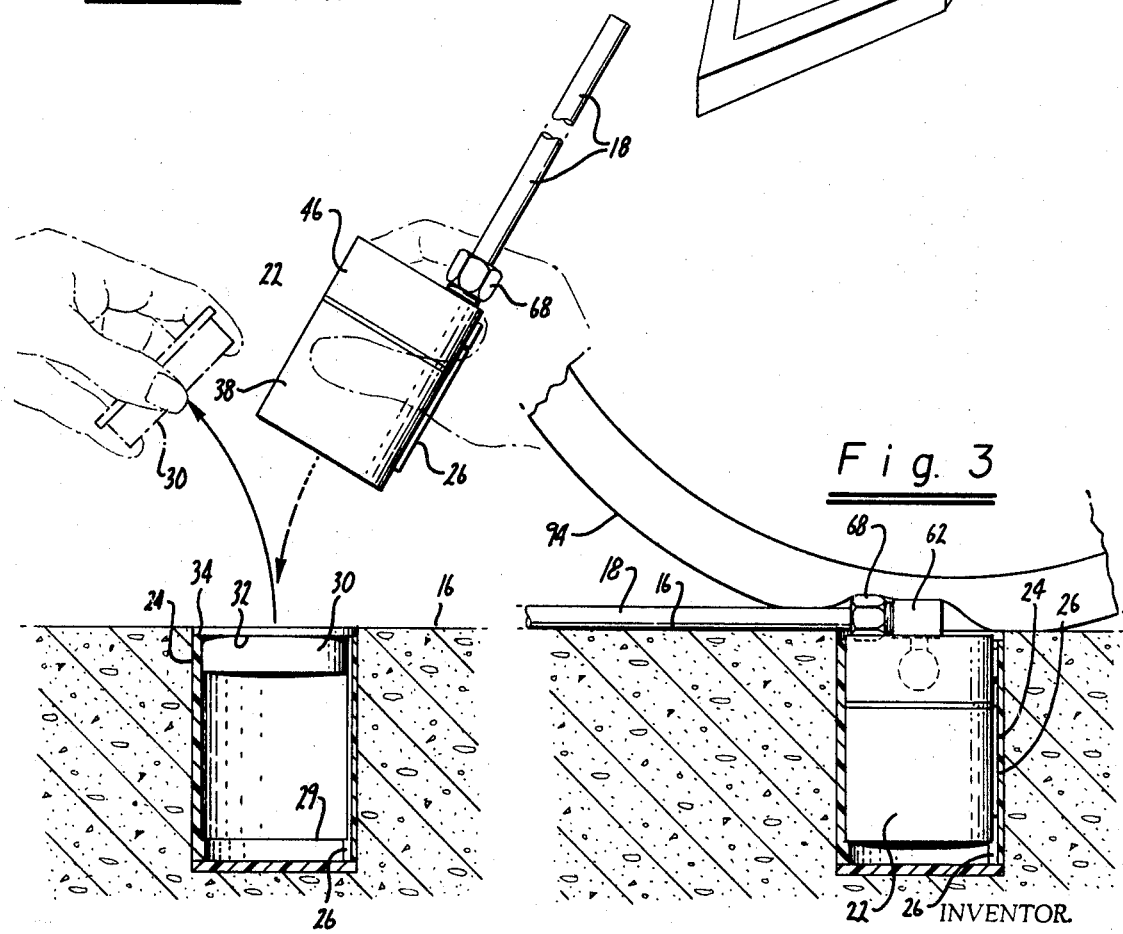
Fig. 3
Fig. 2
INVENTOR.
Robert E. Doggett
BY Warren, Rubin,
Brucker & Chickering,
His Attorneys July 7, 1970  R. E. DOGGETT  3,519,803

VEHICLE COUNTER

Filed Sept. 30, 1968  2 Sheets-Sheet 2

INVENTOR.
Robert E. Doggett
BY Warren Rubin,
Brucker & Chickering,
His Attorneys

United States Patent Office 3,519,803
Patented July 7, 1970

3,519,803
VEHICLE COUNTER
Robert E. Doggett, 7821 Outlook Ave.,
Oakland, Calif. 94605
Filed Sept. 30, 1968, Ser. No. 763,747
Int. Cl. B61l *1/16*
U.S. Cl. 235—99
11 Claims

ABSTRACT OF THE DISCLOSURE

A vehicle counter adapted to be positioned beneath a roadway which has an elongated actuating member pivotally connected at its lower end with a housing for the counter. The actuator member is biased into an upstanding position over the roadway for engagement and pivotal displacement by passing vehicles. A connection between the actuator member and the counter for effecting the actuation of the latter and means for positioning the pivot axis of the actuating member a predetermined distance below the roadway are also provided. The actuator member can be pivoted into a substantially horizontal supported position on the roadway when engaged and run over by a tire of a passing vehicle.

BACKGROUND OF THE INVENTION

This invention relates to removable traffic counters particularly well adapted for use around intermittently used parking lots, driveways, etc.

Prior art traffic counters for temporary installation at entranceways to intermittently used parking lots, for example, generally include an eclosure housing the counter and a wand or rod extending outwardly and upwardly of the housing. When the entranceway is to be used, as during a sports event at an adjacent sports arena, for example, the traffic counter is placed on the center of the entranceway with the pivotal axis of the wand, which is above the roadway, perpendicular to the direction of movement of the vehicles. When a vehicle passes over the counter, its bumper and under carriage deflects the wand downwardly, actuates the counter and registers the vehicle thereon.

Such devices have become widely used to monitor entrance fees or tolls collected by attendants and work entirely satisfactory as long as the counter remains in its original position, i.e. as long as the pivotal axis of the wand is perpendicular to the direction of the passing vehicles. Frequently, however, the orientation of the pivot axis relative to the direction of the passing vehicle changes, either because the counter has been accidentally moved by a vehicle, or because the passing vehicle does not move parallel to the predetermined direction of its movement. The relatively long wand then projects sideways and can be contacted by a tire of the next following vehicle, thereby causing the breakage of the wand since the full length of the wand cannot be supported by the roadway. As a result, the counter becomes unusable until its wand is replaced which is, ordinarily, not after the close of the event for which the parking lot has been activated. It is also possible, particularly with small sports cars, that the vehicle tire passes directly over the counter which can cause the same damage to the wand and may, in addition, damage the counter housing.

SUMMARY OF THE INVENTION

The present invention provides a removable vehicle counting apparatus which is water tight, lightweight and cannot be damaged by vehicles passing over it even if contacted by a tire of the vehicle. Briefly, the invention comprises counting means and an elongated actuator member therefor, and means for mounting the counting means beneath a vehicle roadway. The actuator member has a pivotal connection at a normally lower end and is biased to an upstanding position over the roadway for engagement and pivotal displacement by a passing vehicle. A connector between the actuator member and the counting means effects actuation of the latter and the mounting means functions to locate the pivotal connection a predetermined distance below the roadway. The actuator member and the connection therefor are formed to permit pivotal movement of the member to a substantially horizontal supported position on the roadway when engaged and run over by a tire of a passing vehicle.

In the presently preferred embodiment of this invention, the actuating means is positioned in and invisibly encapsuled by a watertight enclosure which can be opened to permit the reading of the counting means. A receptacle is permanently mounted in the roadway and constructed to receive and orient the enclosure so that the actuating member, which is an elongate rod, points in the direction of movement of the traffic and is pivotable about an axis transverse to the direction of the traffic. The connection between the actuator member and the counting means is constructed to provide actuation of the counting means when the actuating member pivots from its original, upright position, through an arc of approximately 45°, while the actuating means is inoperative during pivotal movement of the actuator member through the remaining arc until it is supported by the roadway surface.

This vehicle counter is fully positioned beneath the roadway so that it cannot be damaged even if the tire of a vehicle passes directly thereover. The actuating member can be pivoted until it is fully supported by the roadway whereby its breakage, which was common in prior art vehicle counters, is prevented. Movement and displacement of the counter on the roadway is impossible since the receptacle positively maintains the counter orientation.

BRIEF DESCRIPTION OF THE DRAWINGS

FIG. 1 is a perspective view of an entrance to a parking lot which includes a vehicle counting apparatus constructed in accordance with the present invention;

FIG. 2 is a cross sectional view through a receptacle in the pavement, closed with a cover and adapted to receive the traffic counter;

FIG. 3 is a view similar to FIG. 2 but shows the traffic counter installed in the receptacle and a wheel of a vehicle passing over the traffic counter;

DESCRIPTION OF THE PREFERRED EMBODIMENT

Figure 5:
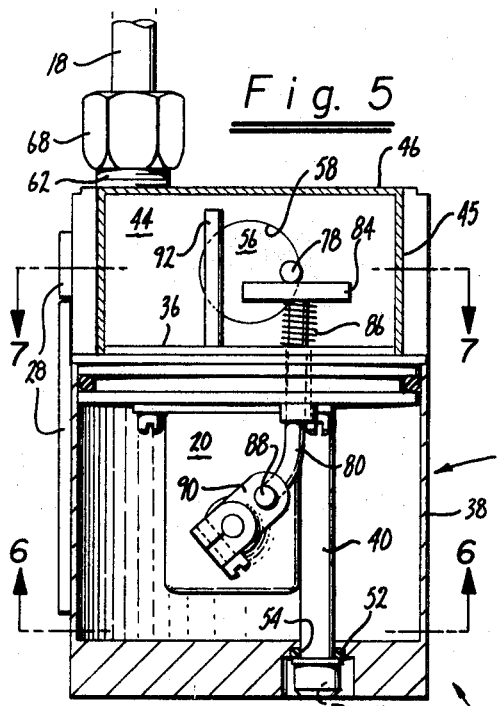
FIG. 5 is a side elevation with the housing shown in section.
Figure 6:
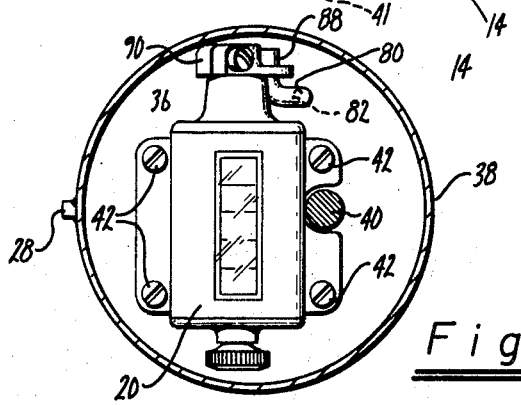
FIG. 6 is a bottom end view, in section, taken on line 6—6 of FIG. 5.

Referring to FIGS. 1 through 3, a vehicle such as a passenger automobile or car 10 proceeds to a parking lot through an entranceway 12 and passes over a vehicle counting apparatus 14 installed beneath a roadway or pavement 16 at about the median of the entranceway. The counting apparatus includes an upwardly projecting vehicle engaging wand or rod 18 which is pivoted downwardly toward the pavement by the passing vehicle to thereby actuate a vehicle counter 20 (shown in FIGS. 4 through 6). The rod is preferably constructed of fiberglass or a similarly brittle material to prevent damage to the passing vehicle and to prevent permanent deformation to the rod which can result in the malfunctioning of the counting apparatus.

Referring to FIGS. 2 and 3, the vehicle counter includes a preferably cylindrical housing or enclosure 22 which encapsules the counter and journals the rod to enable the latter's pivotal movement. When in use, the housing is disposed beneath the pavement in a preferably cylindrical receptacle 24 permanently anchored in the ground. The receptacle includes a groove or keyway 26 extending over its full length and engaged by a matingly constructed key or projection 28 on housing 22. To insert the counting apparatus 14 in the receptacle the key and the groove must be aligned whereby the counting apparatus is positioned and oriented relative to the flow of traffic through entranceway 12. The depth to which the housing enters the receptacle is controlled by an annular shoulder 29 adjacent the lower end of the receptacle.

While the counting apparatus is removed from the receptacle, the latter is closed by a lid 30 substantially flush with roadway 16. The lid is preferably constructed of a corrosion-resistant material and fits tightly into the receptacle to prevent the entrance of water. One end of the lid includes a flange 32 which engages an end face 34 of the receptacle to maintain the lid in position and prevent it from being forced into the receptacle as, for example, by a passing vehicle or a person walking over it.

Referring to FIGS. 4 through 8, the housing includes a base 36 and an enclosure 38 demountably secured thereto by a threaded bolt 40 engaging a threaded hole (not shown) in the base. The bolt is of the type which requires a special wrench to operate it to prevent unauthorized persons from opening it and includes a specially shaped recess 41 such as an Allenhead key recess, for example. The base is a cylindrical disc which, at its side facing the enclosure, mounts the counter 20 with a plurality of machine screws 42. The other side of the disc includes a pair of laterally spaced journal blocks 44 which extend transversely away from the disc. A cylindrical shell 45 has an outer diameter equal to that of enclosure 38, encircles the journal blocks, and extends from the base so that its free end is flush with upper faces 48 of the journal blocks. A pair of closure plates 46 are secured to the upper faces of the blocks with threaded bolts (not shown) and have the configuration of the circle segment defined by the journal blocks and the periphery of the cylindrical shell. The plates prevent water and moisture as well as dust from entering interior spaces 47 defined by the journal blocks, the shell and the closure plates.

The periphery of the base includes an annular groove for retaining an O ring 50 and sealing the interior of enclosure 38 from the exterior. Another O ring 52 (shown in FIG. 5) prevents moisture and dust from entering past the space between bolt 40 and an aperture 54 in the bottom of the enclosure through which the bolt projects. Thus, all interior portions of the housing are sealed and maintained dry and uncontaminated.

A pivot shaft 56 is journaled in blocks 44 and projects into the interior spaces 47 through aligned bores 58 in the journal blocks. Conventional O-rings 59 are provided in the bores to further seal the interior spaces from the exterior. A radially disposed pin 60 projects from shaft 56, mounts a rod holder or socket 62 at its outer end, and is secured to the shaft and the holder such as by welding or brazing it thereto. The rod holder has a preferably cylindrical configuration and includes a blind bore 64 terminating at the end of the holder facing away from housing 22. A normally lower end of rod 18 is disposed in the blind bore of the holder and includes a compression ring 66 which is engaged by a compression nut 68 threaded onto the externally threaded end of the holder facing away from the housing. The compression ring and nut clamp the rod to the rod holder so that the rod can pivot with shaft 56 while permitting the ready and quick replacement of the rod should the rod become damaged or worn. It should be noted that the axis of the rod can be pivoted into a position in which it is perpendicular to the axis of housing 22, i.e., parallel to roadway 16 as shown in FIG. 3, while it is spaced apart from shaft 56 in the direction of the axis of the housing a distance equal to the distance between the roadway and the center of shaft 56 plus about one-half of the diameter of rod 18.

Figure 7:
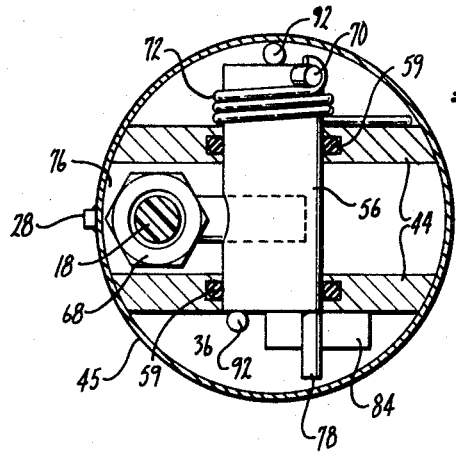
FIG. 7 is a plan view, partially in section, of the counting apparatus.
Figure 8:
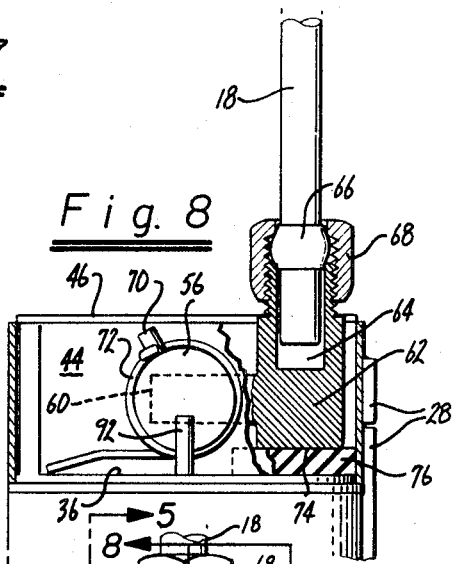
FIG. 8 is a fragmentary side elevation, with parts broken away and the housing shown in section.
Figure 4:
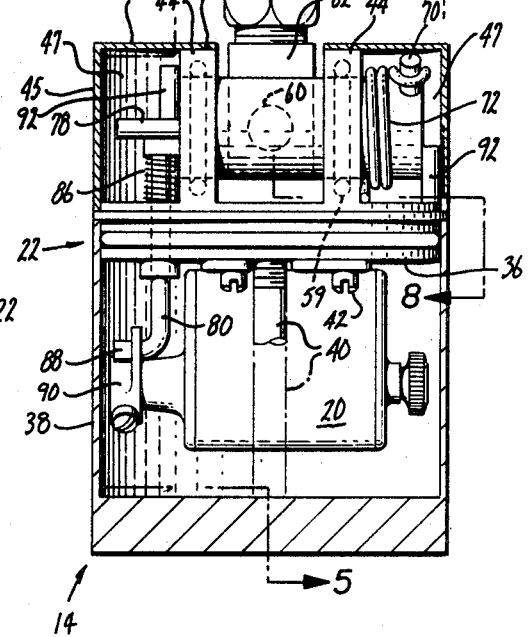
FIG. 4 is a front elevation, partially in section, of the traffic counter.

Referring to FIGS. 4, 7 and 8, an anchor pin 70 is disposed adjacent one end of pivot shaft 56 and projects radially away from the shaft. The anchor pin engages an end of a helical compression spring 72 which is disposed around shaft 56 to provide a compact construction that can be housed in space 47 defined by shell 45. The other straight end of the spring is supported by base 36. The spring biases the pivot shaft in a clockwise direction, as viewed in FIG. 8, until a lower end 74 of rod holder 62 engages the base or, preferably, a pad 76 secured to the base and positioned beneath the rod holder. The pad is constructed of a resilient material, such as hard rubber or plastic, for example, to prevent oscillations of rod 18 and holder 62 when the deflected rod is suddenly released and returned to its normal position by spring 72.

Referring to FIGS. 4 through 7, the other end of pivot shaft 56 includes an actuating pin 78 which is parallel to the pivot shaft but positioned radially outward of the axis of the shaft. A plunger 80 is axially moveably disposed in a bore 82 through base 36 and includes an elongate, rectangularly shaped transverse bar 84 biased into engagement with actuating pin 78 by a compression spring 86. The other end of the plunger is formed to define a finger 88 engaging a counter 20 actuating bell crank 90 to thereby provide a positively acting compact and relatively inexpensive connection between pivot shaft 56 and counter 20.

A pair of positioning pins 92 project transversely away from base 36 to prevent axial movement of pivot shaft 56 and maintain rod holder 62 as well as rod 18 in their proper position relative to journal blocks 44.

To assemble counting apparatus 14, at least one of the positioning pins 92 is removed and pivot shaft 56, with pin 60 and holder 62 removed therefrom, is axially moved into position through bores 58 in journal blocks 44. The positioning pins are installed as are pins 60 and rod holder 62, the latter being securely mounted to the shaft. Spring 72 is placed on the shaft and engaged with pin 70 and base 36 to bias lower end 74 of holder 62 into engagement with pad 76. Plunger 80 is inserted through bore 82, bar 84 is secured to the plunger and engaged with compression spring 86 and transverse finger 88 is connected with bell crank 90 of counter 20. Shell 45 and closure plates 46 are secured to the base and the journal and enclosure 38 is secured to the base with bolt 40. The counting apparatus is now ready for use.

Turning to the operation of the apparatus, and assuming that receptacle 24 has been installed beneath pavement 16 and closed with lid 30, the latter is removed and the counting apparatus 14 is positioned in the receptacle by first aligning key 28 with groove 26 and then dropping the counting apparatus into the receptacle. The key and the groove are positioned so that the pivot axis (pivot shaft 56) of rod 18 and rod holder 62 is transverse to the designated direction of traffic through entranceway 12. Spring 72 now biases the rod into an upstanding, vehicle engaging position (shown in FIG. 1). Each time a car passes the apparatus the rod is engaged by portion of the car, say its bumper, and pivoted downwardly toward the roadway through an angle which is a function of the height of the bumper, or the car's undercarriage, and the length of the rod. To assure that the rod is contacted and pivoted through a sufficient arc by vehicles such as trucks, which have bumpers and undercarriages at substantial distances from the roadway, the length of the rod is preferably a minimum of about 30 inches. Counter 20 as well as bell crank 90, plunger 80, and the position of actuating pin 78 with respect to pivot shaft 56 are constructed so that the counter registers (i.e. indexes) when the rod is pivoted through an angle of no more than about 45° from its original or vehicle engaging position. Pivotal movement of the rod through the remaining arc until the rod is flush with the roadway (shown in FIG. 3) does not register on the counter even if the rod should pivot in the opposite direction up to about 45° as the car moves over the counting apparatus due to unevenness of and variations in the distance between the undercarriage and the roadway. Accidental double registration of a single vehicle is thus avoided.

It should be noted that rod 18 can be pivoted into a horizontal position in which it is flush with the roadway surface over substantially its full length by virtue of the construction of pivot shaft 56, pin 60 and rod holder 62 discussed above. Thus, if a wheel 94 of car 10 passes over rod 18 the latter is neither deformed nor broken since it is fully supported by the pavement. Even if a car should pass the counting apparatus at an angle to the plane in which rod 18 pivots, thereby subjecting the rod to a glancing blow from the bumper or from a wheel passing directly thereover, the apparatus is maintained in its proper orientation by the interengagement of groove 26 and key 28 in the receptacle and the housing, respectively.

Each time a car passes over the counting apparatus, spring 72 immediately returns housing 62 and rod 18 to their original upright position so that the danger of missing a passing vehicle resulting from a slow return of the rod to its original position is prevented. In addition, the resilient pad 76 prevents undesirable oscillations of the rod after it contacted base 36 at high speed.

The counting apparatus thus keeps a precise record of the number of cars passing over it to provide a double check on the parking fees or toll charges received at the entranceway. Moreover, the attendant cannot ascertain the number of cars that have been registered since the counter is invisibly encapsuled within housing 22 and removed of the counter and opening the housing is not feasible except by supervising personnel.

At the end of the day, or at such other times as it is desirable, authorized personnel record the number of cars that have passed through entranceway 12 and for which fees or charges have been collected. The counting apparatus is then replaced in receptacle 24 or, if no traffic is expected because the entranceway closes or is not to be used for substantial periods of time, the counting apparatus is removed and the receptacle is closed with a cover 30 to prevent the accumulation of debris and water therein.

I claim:

1. A vehicle counting apparatus comprising, counting means and an elongated actuator member therefor, means for mounting said counting means beneath a vehicle roadway, said actuator member hving a pivotal connection at a normally lower end and being biased to an upstanding position over said roadway for engagement and pivotal displacement by a passing vehicle and having a connection for effecting actuation of said counting means, said mounting means functioning to locate said pivotal connection at a predetermined distance below said roadway, said member and connection being formed to permit pivotal movement of said member to a substantially horizontal supported position on said roadway when engaged and run over by a tire of a passing vehicle.

2. A vehicle counting apparatus as defined in claim 1 wherein the lower end of said member is formed with an offset substantially equal to said distance.

3. A vehicle counting apparatus as defined in claim 1, said mounting means providing an enclosure for said counting means and a bearing for said member providing said pivotal connection, and means sealing said bearing to provide a water-tight enclosure for said counting means.

4. A vehicle counting apparatus as defined in claim 3 wherein said enclosure invisibly encapsules said counting means and is constructed of parts demountably secured to each other to permit opening of said enclosure and reading of said counting means.

5. A vehicle counting apparatus as defined in claim 3, wherein said mounting means comprises in addition to said enclosure a receptacle adapted for permanent mounting in the roadway and being formed for receipt of said enclosure, said receptacle and enclosure being formed to orient the axis of said pivotal connection transversely to a designated direction of movement of vehicles.

6. A vehicle counting apparatus as defined in claim 1, wherein said pivotal connection provides displacement of said member through about 90° and said connection between said member and counting means is formed to actuate the latter when said member is displaced through approximately the first 45° of displacement from vertical and pivotal movements of said member within the remaining arc being inoperative to actuate said counting means.

7. A vehicle counting apparatus as defined in claim 1, and demountable fastening means for the lower end of said member comprising a socket member formed to receive said actuator member, a compression ring mounted on said actuator member, and a nut threaded on said socket member and bearing against said compression ring and clamping said compression ring between said nut and socket member.

8. A vehicle counting apparatus as defined in claim 7, said mounting means providing a bearing, said demountable fastening means having a shaft journaled in said bearing, and a helical spring mounted on said shaft and connected thereto and to said mounting means for biasing said actuator member to a substantially vertical position.

9. A vehicle counting apparatus as defined in claim 8, wherein the connection between said actuator member and counting means comprises, a reciprocation part connected to said counting means, and cam means connected to said shaft and engaging said part for effecting a displacement thereof.

10. A vehicle counting apparatus as defined in claim 9, and means limiting the pivotal displacement of said member from a lowered actuated position to a substantially upright position, and including oscillation dampening means.

11. A vehicle counting apparatus as defined in claim 5, and a lid formed to engage said receptacle and providing a water-tight enclosure therefor when said enclosure is removed from said receptacle, said receptacle being adapted for mounting in said roadway with said lid substantially flush with the surface thereof.

References Cited

UNITED STATES PATENTS

| 2,782,990 | 2/1957 | Henkelman | 235—99 |
| 2,829,832 | 4/1958 | Henkelman | 235—99 |
| 3,408,563 | 10/1968 | Chapman et al. | 324—45 |

STEPHEN J. TOMSKY, Primary Examiner